United States Patent

Hayashi et al.

Patent Number: 5,417,914
Date of Patent: May 23, 1995

[54] METHOD FOR EXTRACTING MOLDED PRODUCT FROM INJECTION MOLDING DIE

[75] Inventors: Yoichi Hayashi; Iwao Komaki, both of Kanagawa, Japan

[73] Assignee: Fuji Photo Film Co., Ltd., Kanagawa, Japan

[21] Appl. No.: 974,208

[22] Filed: Nov. 10, 1992

[30] Foreign Application Priority Data

Nov. 13, 1991 [JP] Japan .................. 3-101049 U
Nov. 20, 1991 [JP] Japan .................. 3-102784 U

[51] Int. Cl.⁶ .................................. B29C 41/42
[52] U.S. Cl. ........................ 264/335; 264/334; 264/336; 425/437
[58] Field of Search .......... 264/334, 335, 336; 425/437

[56] References Cited

U.S. PATENT DOCUMENTS

| | | | |
|---|---|---|---|
| 3,594,462 | 7/1971 | Vrijma | 425/437 |
| 3,677,674 | 7/1972 | Bowles | 425/437 |
| 3,876,352 | 4/1975 | DeTroyer et al. | 425/437 |
| 5,039,299 | 8/1991 | Hehl | 264/335 |
| 5,156,798 | 10/1992 | Bruning | 264/335 |

FOREIGN PATENT DOCUMENTS 756995 9/1952 Germany .................. 264/335

Primary Examiner—Jan H. Silbaugh
Assistant Examiner—A. Ortiz
Attorney, Agent, or Firm—Sughrue, Mion, Zinn, Macpeak & Seas; Richard C. Turner; Marie-Claire Boisvert

[57] ABSTRACT

A method and apparatus for extracting a molded product wherein the molded product, specifically, a shutter molded of a synthetic resin with a very small thickness, from an injection molding die at a high speed without malfunction or deformation of the molded product. The apparatus includes as essential components an opposing pair of chucking members for supplementarily supporting a molded product in the clamped state while restrictively locating it at a predetermined position, and a suction pad located in alignment with the predetermined position of the molded product for grasping the latter by the action of suction. In an alternate embodiment, two chuck arms having respective suction pads at their ends are moved into contact with the shutter from opposite sides. With the invention the molded product can completely be extracted from an injection molding die in cooperation of the chucking members with the suction pad.

2 Claims, 3 Drawing Sheets

METHOD FOR EXTRACTING MOLDED PRODUCT FROM INJECTION MOLDING DIE

BACKGROUND OF THE INVENTION

The present invention relates generally to a method and apparatus for extracting a molded product from an injection molding die. More particularly, the present invention relates to a method and apparatus for extracting from an injection molding die a slidable shutter adapted to be attached to a cartridge Case in which a disc-shaped recording medium is received.

In recent years, disc-shaped recording media such as magnetic discs, optical discs, photomagnetic discs and the like have been increasingly used owing to their advantageous properties, e.g., simple and easy handling and large data storage capacity per unit volume of disc.

A 3.5 inch micro floppy disc as shown in FIG. 5 is a typical example of a disc cartridge employable as a disc-shaped recording medium. This micro-floppy disc 1 is constructed such that a magnetic disc 5 is rotatably received in the hollow space defined between upper and lower rectangular shell halves 2 and 3 injection-molded of acrylonitrile-butadiene-styrene copolymer resin or the like. The magnetic disc 5 is prepared in the form of a magnetic recording medium having a magnetic layer uniformly formed on the surface of a circular high-molecular film base, and a ring-shaped center plate 4 is secured to a circular opening formed at the central part of the magnetic disc 5. In addition, a circular opening 7 is formed at the central part of the lower shell half 3 of the micro-floppy disc 1 so as, to allow a motor shaft to be inserted into a substantially square motor shaft insert hole 6 formed at the central part of the center plate 4.

Additionally, magnetic head insertion openings 8 are formed on the upper and lower shell halves 2 and 3 so as to allow a magnetic head and a head pad to be received in the foregoing openings 8 in order to electro-magnetically write data to or read data from the magnetic disc 5.

To prevent dust or similar foreign material from entering the micro-floppy disc 1 via the magnetic head insertion openings 8 and then adhering to the disc, the micro-floppy disc 1 is provided with a slide-type shutter 9 for opening and closing the magnetic head insert openings 8.

The shutter 9 has hitherto been made by bending a metal sheet such as a stainless steel sheet or the like to obtain a U-shaped cross-sectional contour.

The shutter 9 can slidably be displaced in the direction of opening/closing of the magnetic head insert openings 8 with the aid of projections extending inward of the inner wall of the shutter 9 in the vicinity of the bottom of the latter and a guide groove adapted to receive the projections. The guide groove extends parallel to the side edge on the front surface of the lower shell half 3. In other words, the shutter 9 can slidably be displaced within a slidable movement region 11 along the side wall surfaces of the micro-floppy disc 1, which region includes the periphery of each magnetic head insertion opening 8.

In addition, openings 10 are formed on the shutter 9 positionally aligned with the magnetic head insertion openings 8 so as to allow the magnetic disc 5 to be exposed to the outside therethrough when the micro-floppy disc 1 is in the operative state. On the other hand, the magnetic head insertion openings 8 are closed by the shutter 9, causing the magnetic disc 5 to be covered with the shutter 9 as illustrated by phantom lines in FIG. 5, when the micro-floppy disc is in the inoperative (storage) state.

Recently, various proposals have been made to replace the conventional metal shutter with a less expensive shutter molded of a synthetic resin. See, for example, Japanese Patent Laid-Open Publications Nos. 60-231985 and 64-70981. In consideration of the function of the shutter, a crystalline plastic material having a self-lubricating property, such as polyacetal resin, has generally been used as the synthetic resin for the shutter. With a crystalline plastic material, however, it is required that the molding die in which the material is injected be heated to a high temperature sufficient to promote growth of crystals (normally about 70° C. to 90° C.). As a result, the molded product must be extracted from the injection molding die also at an elevated temperature, typically about 80° C. to 100° C.

To extract the molded product from the mold and pass it to a subsequent production processing station, a chucking (extraction) apparatus as disclosed in, e.g., Japanese Utility Model Laid-Open Publications Nos. 57-4310 and 59-129517 has hitherto been used. Specifically, such a chucking apparatus is constructed such that a pair of chuck members, which are opened and closed by cylinders, squeeze the molded product in such a manner as to clamp it from opposite sides with chucking surfaces. The molded product is then extracted from the injection molding die.

However, when a shutter is molded of a synthetic resin, as already discussed, the molded product must be extracted from the injection molding die at a high temperature. This molded product has a very small thickness ranging from about 0.2 mm to 0.5 mm. For this reason, when an extracting apparatus of the type described above is employed for the purpose of extracting the molded product from the injection molding die, there arises a problem in that the molded product can be readily deformed by only a relatively small exterior force (chucking force) imparted by the extracting apparatus. In addition, since the shutter, i.e., molded product, is deeply received in the injection molding die, when it is clamped from the opposite sides in the direction at a right angle relative to the direction of extraction at positions offset from predetermined positions during the extracting operation, there arises another problem in that an abnormally high extracting force acts on the molded product.

Further, when a U-shaped shutter 50 (molded product) having a very small thickness is held by chucking surfaces 51 from the opposite sides in the clamped state, sometimes the shutter 50 is held in an inclined state such that only one side wall of the shutter 50 contacts the chucking surface 51, causing the rear surface 50a (U-shaped bent joint portion) of the shutter 50 to be convexly deformed, as illustrated by phantom lines in FIG. 6. Once such convex deformation occurs, precise gripping of the shutter 50 is not assured, and, moreover, correct transference of the shutter 50 to a subsequent processing stage can be achieved only with much difficulty.

Since each chucking surface 51 is generally lined with an elastic material 52, left- and right-hand corner portions 50b of the rear surface 50a forcibly encroach on both elastic materials 52, resulting in small recesses 53 being formed thereon. The presence of these recesses 53 sometimes leads to a part of the shutter 50 located directly below each corner portion 50b being concavely deformed.

To avoid deforming the shutter 50 by the chucking surfaces, it might be considered to reduce the magnitude of chucking force. However, if the chucking force is weakened, the reliability for holding the shutter 50 in the clamped state is reduced. For this reason, it is very difficult to properly adjust the magnitude of the chucking force.

In another conventional extracting apparatus of the foregoing type, a suction pad is brought in close contact with the rear surface of the shutter from above so that the shutter is extracted from the injection molding die while maintaining the desired orientation of the shutter. However, when the apparatus is provided with a suction pad, since the rear surface of the shutter has a very small thickness of about 3.6 mm, it is necessary that the position of the suction pad be precisely controlled in order to assure that the suction pad can provide a sufficiently high suction force. For this purpose, as shown in FIG. 7, after a shutter 50 is raised a predetermined height above the injection molding die by actuating an ejection pin 61, the shutter 50 is brought into close contact with a suction pad 63 disposed at a certain deep position in a guide 64 having inclined guide surfaces 65 formed thereon to guide the raising movement of both side surfaces of the shutter 50.

However, since the shutter 50 is still at an elevated temperature and hence is still quite soft, an abnormal force can readily be imparted to the shutter 50 when the rear surface 50a of the shutter is inserted into the guide 64 toward the suction pad 63 along the inclined guide surfaces 65, resulting in the position of the guide 64 being largely dislocated. In an extreme case, the ejection pin 61 can be damaged or broken by the guide 64.

Japanese Utility Model Laid-Open Publication No. 57-129517 illustrates a chucking apparatus constructed such that a molded product is clamped from opposite sides by a pair of chuck members each including a suction pad on one side thereof. With the chucking apparatus constructed in the above-described manner, a vacuum switch is provided to detect whether or not the molded product is clamped by the chuck members via the suction pads. In this case, the molded product is held by the chuck members, and each suction pad serves merely as detecting means. Since each suction pad is fitted into a recess formed on the chucking surface of the corresponding chuck member, when it is used as holding means, it cannot make soft contact with the molded product because it does not project from the open end of the recess formed on the chuck member.

In case that the molded product is held merely by the suction pad disposed on one side, there is a possibility that the molded product is held in an inclined state. In addition, in case that the molded product is held directly by the forward ends of piston rods in pneumatic cylinders, it is difficult as a practical matter to finely adjust the magnitude of holding force applied by the pneumatic cylinders. For this reason, employment of the pneumatic cylinders in the above manner is not suitable for holding a soft molded product such as a shutter or the like. In addition, employment of two pneumatic cylinders for holding a single molded product is not acceptable for economical reasons.

Further, Japanese Utility Model Laid-Open Publication No. 57-4310 describes a chucking apparatus constructed such that a molded product molded of a synthetic resin is held by a grasping member including contact pieces. With this construction, the grasping member, operatively connected to a cylinder unit, serves to grasp a molded product such as scissors by a turning movement of the grasping member about a pin. However, it is very difficult to finely adjust the magnitude of the force for clamping the molded product with the aid of the grasping member connected directly to the cylinder unit. Also in this case, the grasping member grasps a member harder than the shutter. Thus, the grasping member cannot be employed as a holding member for holding a soft molded product such as a shutter formed by a sheet material.

SUMMARY OF THE INVENTION

The present invention has been made in consideration of the foregoing, and an object thereof resides in providing a method and apparatus for extracting a molded product from an injection molding die at a high speed without malfunction or deformation of the molded product.

To accomplish the above and other objects, the present invention provides a method and apparatus for extracting a molded product from an injection molding die, wherein the apparatus includes an opposing pair of chucking members fixedly secured to a movable frame for supplementarily holding a molded product having a U-shaped cross-sectional contour in the clamped state by bringing the chucking members into contact with both side surfaces of the molded product with the aid of elastic members attached to the forward ends of the chucking members while the molded product is restrictively located at a predetermined position, and a suction pad adapted to come into airtight contact with a rear surface of the molded product whose position has been restrictively determined by the chucking members, the suction pad being elastically displaceable at a right angle relative to the direction of actuation of the chucking members, wherein, after the molded product has been partially removed from the injection molding die, it is held by the chucking members in the clamped state at a predetermined position, and, thereafter, the suction pad comes into tight contact with the rear surface of the molded product, allowing the molded product to be completely extracted from the injection molding die as the support frame is displaced in the upward direction.

To further accomplish the above object, the present invention provides a method and apparatus for extracting a molded product from an injection molding die, wherein a displaceable support frame includes an opposing pair of chuck arms adapted to linearly move toward the molded product, and suction pads projecting from the chuck arms are attached to the chuck arms such that they are located opposite to each other. When the suction pads are elastically brought in close contact with both the side surfaces of the molded product, the latter is firmly held by the chuck arms in the clamped state via the suction pads, and thereafter, as the molded product is displaced in the upward direction, the molded product is extracted from the injection molding die.

DESCRIPTION OF THE PREFERRED EMBODIMENTS

The present invention will now be described in detail hereinafter with reference to the accompanying drawings which illustrate preferred embodiments of the present invention.

Figure 1:
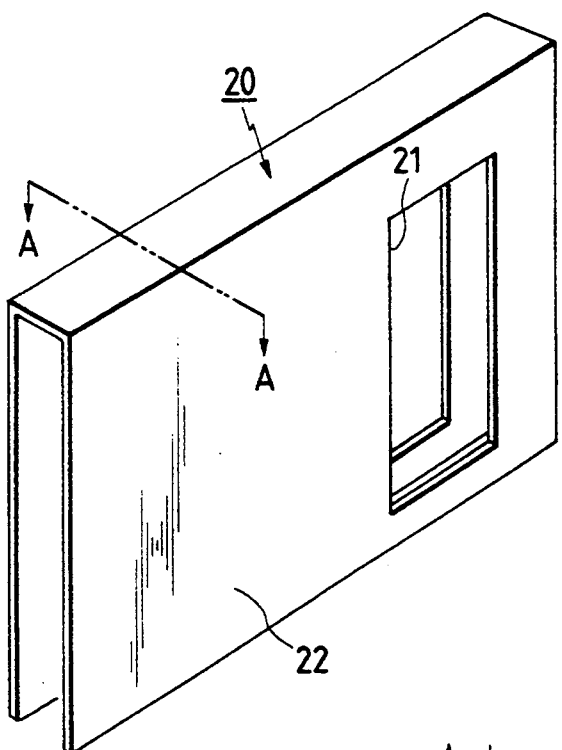
FIG. 1 is a perspective view of a shutter for which an extracting apparatus of the present invention is employable, particularly illustrating the structure of the shutter.

FIG. 1 is a perspective view of a shutter 20 employable for a 3.5inch micro-floppy disc (not shown) which is to be extracted from an injection molding die by operating an apparatus of the present invention.

The shutter 20, which has an inverted U-shape in cross-section, is injection-molded of polyacetal resin. The shutter 20 includes inward extending projections (not shown) at predetermined positions on the inner wall surfaces which are slidably engaged with a cartridge shell. Openings 21 are formed through the cartridge 20. When a cartridge is in use, the openings 21 of the shutter 20 are positionally aligned with a magnetic head insert opening so that a magnetic disc received in the cartridge is exposed to the outside through the openings 21.

Figure 2:
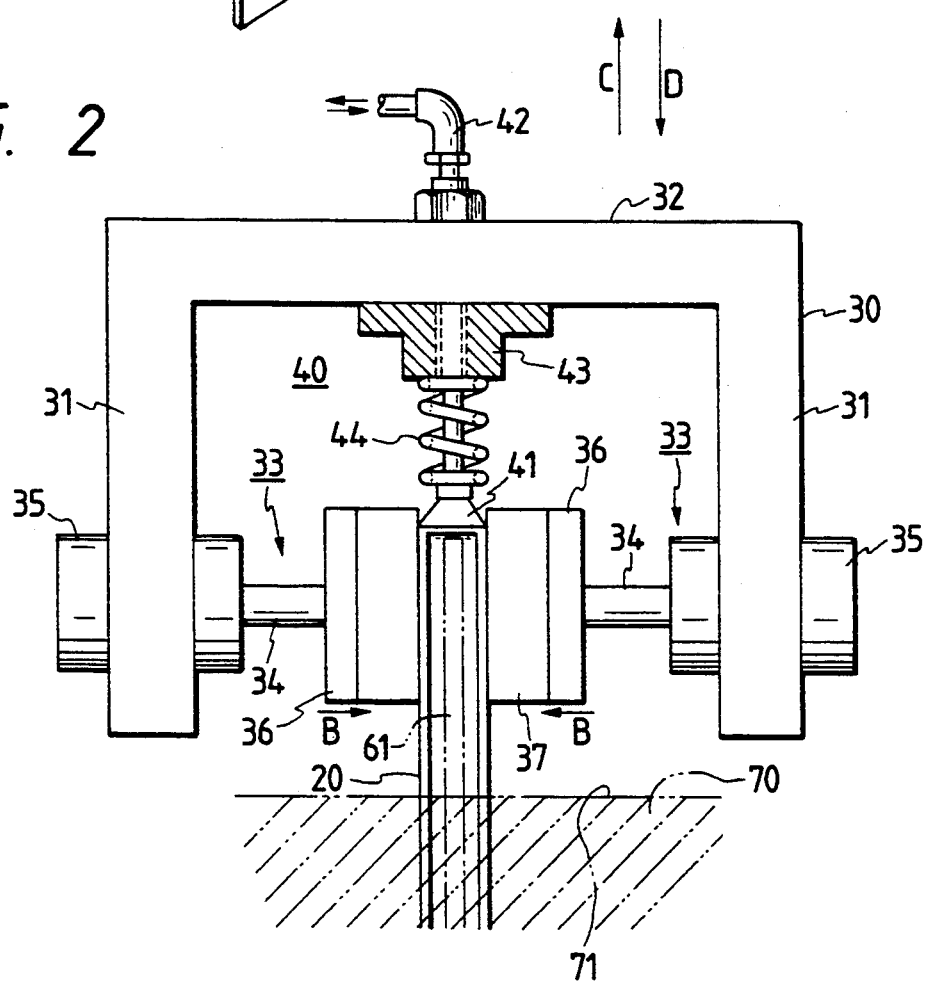
FIG. 2 is a partially sectioned front view of a first embodiment of an extracting apparatus of the invention.

FIG. 2 is a partially sectioned front view of an apparatus 40 for extracting a molded product constructed in accordance with a first embodiment of the present invention.

As shown in the drawing, the apparatus 40 includes a support frame 30 having an inverted U-shape. When an upper die half (not shown) is moved away from a lower molding die half 70 as illustrated by phantom lines in the drawing (i.e., when the movable die half is moved away from the stationary die half), the apparatus 40 can enter the hollow space defined by the support frame 30 (i.e., the apparatus 40 can move in the vertical direction or in the horizontal direction as seen in the drawing). In other words, the apparatus 40 can be displaced in the perpendicular direction relative to a parting plane 71 (i.e., not only in the direction marked by an arrow C, but also in the direction marked by the arrow D). When the support frame 30 is lowered, the apparatus 40 is located at a position spaced away from the lower molding die half 70 by a predetermined distance.

The support frame 30 includes an opposing pair of side arms 31 to which chucking members 33 are secured. In addition, the support frame 30 includes an upper arm 32 to which a suction unit including suction pad 41 is secured.

A pair of chucking members 33 are secured to the side arms 31 such that they are located opposite to each other. Each chucking member 33 is composed of, a pneumatic cylinder 35 having an expansible/contractible rod 34 and a plate-shaped chucking piece 36. As a pair of chucking pieces 36 are displaced toward each other (i.e., in the direction indicated by an arrow B in the drawing), they are very gently brought into contact with the shutter 20 from opposite sides thereof to supplementarily hold the same in the clamped state.

For this purpose, a piece of sponge rubber is adhesively attached to a contact surface of each chucking piece 36 to serve as an elastic member, and the minimum distance between the opposing pair of chucking pieces 36 at the time the latter come into close contact with the shutter 20 is made to be smaller than the thickness of the shutter 20 by 0.2 mm to 0.8 mm. It should be added that each chucking piece 36 is adapted to come into contact with a region 22 exclusive of the openings 21 formed through the shutter 20 as shown in FIG. 1. A soft silicone-based rubber having a hardness of 15 degrees or less while exhibiting excellent heat resistance is used for the sponge rubber 37.

The suction unit operates such that the suction pad 41 is downwardly displaced toward the shutter 20 by a predetermined distance to come into contact with the rear surface of the shutter 20 (i.e., the upper surface of the inverted U-shaped shutter 20), and the foregoing displacement of the suction pad 41 is achieved by allowing the whole apparatus 40 to be displaced to the side of the lower molding die half 70. It should be noted that the position of the shutter 20 as seen in the horizontal direction in the drawing is previously restrictively determined.

The suction unit will be described in more detail below. A tube 42 communicated with a vacuum pump (not shown) is connected to the rear side of the suction pad 41 such that it extends in the interior of the support frame 30 through a base portion 43 fixedly secured to the upper arm 32 of the support frame 30, allowing the suction pad 41 to be located at a predetermined position. A compression spring 44 is arranged between the suction pad 41 and the base portion 43 while the tube 42 extends through the coil spring 44. The compression spring 44 effectively absorbs the shock caused when the suction pad 41 comes into contact with the rear surface of the shutter 20 after it is lowered a predetermined distance. When the vacuum pump is driven in the reverse direction, air can be blown from the suction pad 41, which serves as a blowing nozzle at this time.

Alternatively, a suitable driving system may be installed on the base portion 43 so as to allow only the suction pad 41 to be displaced in response to a predetermined signal transmitted from the foregoing driving system.

The present invention has been described above with respect to an extraction apparatus which is intended to hold a single shutter in the clamped state as shown in FIG. 2. Alternatively, the present invention may equally be applied to an extraction apparatus for which an injection molding die for simultaneously molding four or eight shutters is employed. In this case, the apparatus is constructed in a manner corresponding to the number of shutters to be molded.

With the apparatus 40 constructed in the above-described manner, after a shutter 20 is molded in the injection molding die, the upper die half is opened and moved away from the lower die half 70. Subsequently, the support frame 30 is displaced to the position directly above the lower die half 70.

When the shutter 20 is partially removed from the lower die half 70 by actuating an ejection pin 61, both pneumatic cylinders 35 are actuated so as to allow the chucking pieces 36 to be displaced (in the direction B) until the chucking pieces 36 are brought into soft contact with both side surfaces of the shutter 20 via the sponge rubbers 37. Thus, the shutter 20 is restrictively located at a predetermined position while it is supplementarily supported by both chucking pieces 36 in the clamped state from opposite sides thereof.

Next, the apparatus 40 is displaced in the D direction, causing the suction pad 41 to come into airtight contact with the rear surface of the shutter 20. In contrast with the illustrated case, if the apparatus 40 is constructed such that only the suction pad 41 can be displaced, the suction pad 41 is lowered a predetermined distance at the same the chucking pieces 36 come into contact with the shutter 20 from both sides, until it is brought into contact with the rear surface of the shutter 20.

While the suction pad 41 is lowered, air is blown from the suction pad 41 so that the rear surface of the shutter 20 is cooled until the suction pad 41 comes into contact with the rear surface of the shutter 20. Consequently, the shutter 20 is hardened. The vacuum pump is driven directly before the suction pad 41 contacts the shutter 20, whereby the interior of tube 42 is evacuated, causing the suction pad 41 to come into airtight contact with the rear surface of the shutter 20. Consequently, the shutter 20 is firmly grasped by the suction pad 41, and, thereafter, as the support frame 30 is displaced away from the lower die half 71 (in the C direction), the shutter 20 is completely removed from the lower die half 71. Subsequently, the apparatus 40 is displaced in the horizontal direction so that the shutter can be transferred to a subsequent processing stage. Upon completion of the transference of the apparatus 40 to the next step, the chucking pieces 36 and the suction pad 41 are actuated in the opposite direction, whereby the shutter 20 is released from the clamped state.

According to the above embodiment of the present invention, an opposing pair of chucking members 33 are brought into soft contact with the shutter 20 from both sides thereof, and the distance between the opposing chucking pieces 36 at the time when they contact the shutter 20 from the opposite sides via the sponge rubbers 37 is made smaller than the thickness of the shutter 20 by about 0.2 mm to 0.8 mm, whereby the shutter 20 is restrictively located at the predetermined position without danger of malfunction or damage to the side surface of the shutter 20 while the latter is supplementarily supported by the chucking pieces 36. In addition, by bringing the suction pad 41 into airtight contact with the rear surface of the shutter 20, the latter is reliably grasped by the chucking pieces 36 in cooperation with the suction pad 41 while it is located precisely at the predetermined position.

Since soft silicone-based rubber having an excellent heat resistance is used for the sponge rubbers 37, a shutter which is still at an elevated temperature and readily deformable immediately after the injection-molding operation can be handled without damage to the sponge rubbers 37. In addition, since the chucking pieces 36 contact the shutter in a region 22 exclusive of openings 21, the extent of adverse influence can be minimized even if the shutter 20 is undesirably deformed for an unavoidable reason.

As is apparent from the above description, according to the present invention, the inventive extracting apparatus is constructed such that a molded product is supplementarily held in the clamped state by an opposing pair of chucking members, and thereafter it is grasped by the suction pad adapted to come into airtight contact with the rear surface of the molded product. Since the molded product is restrictively located at a predetermined position by bringing the chucking members into soft contact with the molded product from opposite sides, the molded product is not damaged by the chucking members. Subsequently, the molded product is grasped in a precise manner by the suction pad while it is restrictively located at the predetermined position. In other words, the inventive extracting apparatus is constructed such that the molded product is extracted from the injection molding die in cooperation of the chucking members with the suction pad. Thus, in contrast with the conventional apparatus constructed such that chucking members and a suction pad are separately actuated, there is no danger of deformation of the molded product. In addition, according to the present invention, since the inventive apparatus is constructed such that the suction pad is brought into airtight contact with the molded product while the latter is restrictively located at the predetermined position, the molded product can exactly be grasped without failure.

A second embodiment of an extracting device of the present invention will now be described in detail hereinafter with reference to FIGS. 3 and 4 of the accompanying drawings.

Figure 4:
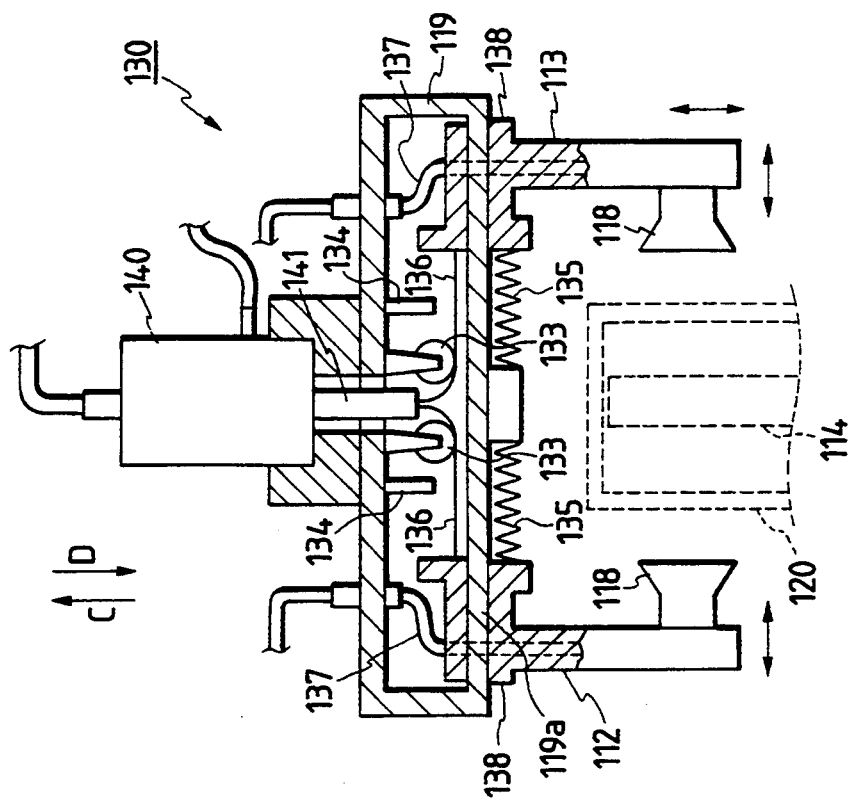
FIG. 4 is an enlarged fragmentary sectional view of the extracting apparatus shown in FIG. 3, particularly illustrating the detailed interior structure of the apparatus.
Figure 3:
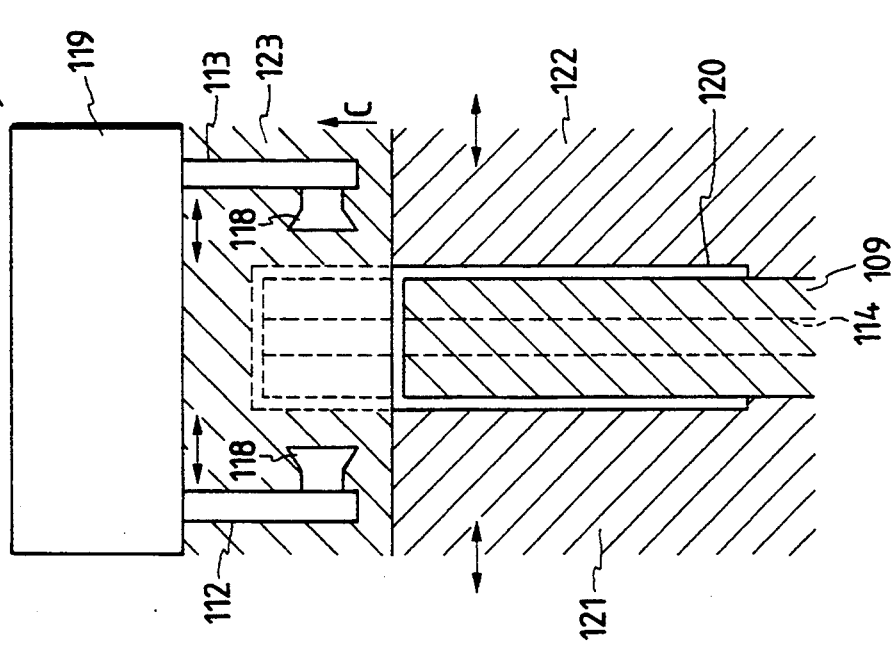
FIG. 3 is a fragmentary sectional view which schematically illustrates the structure of a second embodiment of an extracting apparatus of the invention.
Figure 5:
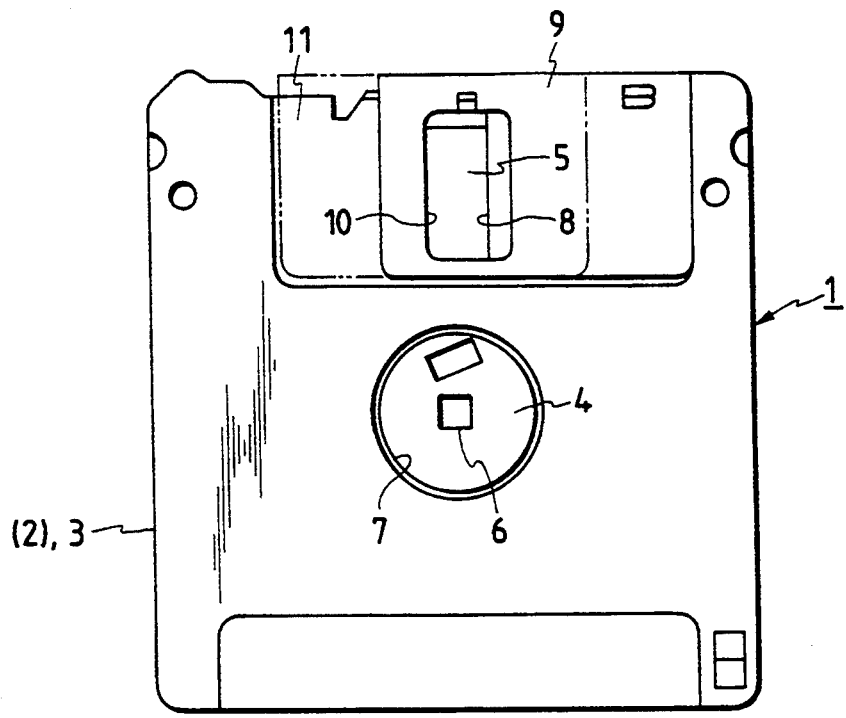
FIG. 5 is an illustrative view of a 3.5 inch micro-floppy disc with the shutter shown in FIG. 1 attached thereto, particularly illustrating the overall structure of the micro-floppy disc.
Figure 6:
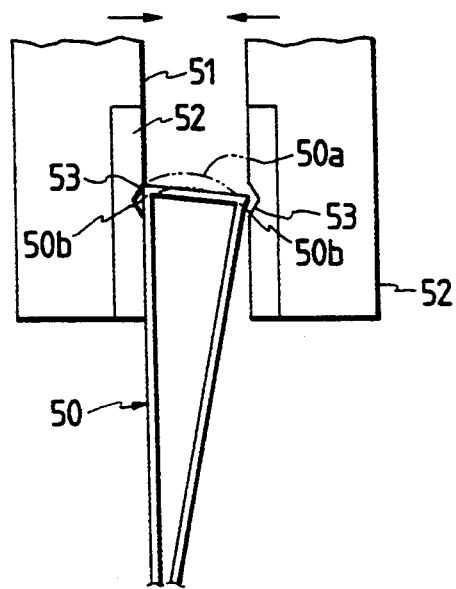
FIG. 6 is a fragmentary sectional view of a conventional extracting apparatus, particularly illustrating the state in which a shutter is held in the inclined state by an opposing pair of side chucks.
Figure 7:
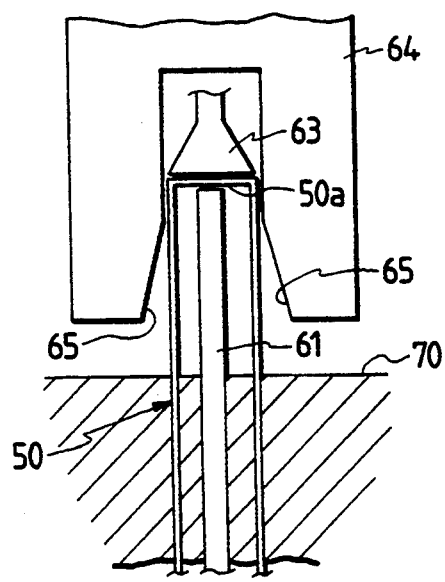
FIG. 7 is a schematic sectional view of the conventional taking-out apparatus, particularly illustrating the state in which the rear surface of the shutter is raised by the action of a vacuum generated by a vacuum pump.

FIG. 3 is a schematic sectional view of the extracting apparatus of the second embodiment, particularly illustrating the overall structure of the apparatus, and FIG. 4 is an enlarged sectional view of the apparatus, particularly illustrating the detailed structure of essential components constituting the apparatus, which is generally designated by reference numeral 130.

Referring to FIG. 4, a chuck driving unit 119 includes an opposing pair of chuck arms 112 and 113 on the opposite sides in the lower region extending downward therefrom. Both the chuck arms 112 and 113 are horizontally freely displaceable in the leftward/rightward direction. A suction pad 118 is disposed at a position in the vicinity of the lowermost end of each of the chuck arms 112 and 113 such that the two suction pads 118 are located opposite to each other. Each of the suction pads 118 is pneumatically connected to a vacuum pump (not shown) which is arranged in the chuck driving unit 119 or installed outside of the same.

As is best seen in FIG. 4, a center core 109 is arranged inside of the shutter 120, and an ejection pin 114 extends through the center core 109 in such a manner that the shutter 120 can be displaced in the upward direction with the aid of the ejection pin 114. Slide cores 121 and 122 adapted to be slidably displaced in the leftward/rightward direction while the gap defined by the shutter 120 is present are arranged on the opposite sides of the center core 120.

The shutter 120 is molded of a synthetic resin by injecting a molten synthetic resin through a nozzle (not shown) into the hollow space defined by the center core 109, the slide cores 121 and 122 and a movable die half 123 (to be described in more detail later).

It should be noted that the movable die half 123 is displaced away from the stationary die half (i.e., in direction indicated by an arrow C in FIG. 4) upon the completion of each injection-molding operation for a shutter 120, whereby a space large enough to enable the extracting apparatus 130 to enter therein is formed.

The detailed structure of the extracting apparatus 130 will be described below with reference to FIG. 4.

The extracting apparatus 130 is formed with suitable grooves (not shown) on a lower end surface 119a of the chuck driving unit 119 including a rectangular support frame 119b. In addition, the extracting apparatus 130 includes two slidable base portions 138 adapted to slidably move along the aforementioned grooves in such a manner as to grasp the frame lower end surface 119a from both the inside and outside surfaces of the frame lower end surface 119a. The chuck arms 112 and 113 having the suction pads 118 attached thereto extend downward of the slidable base portion 138.

Each of the suction pads 118 is molded of an elastomeric material such as rubber or the like and projects inward of the chuck arms 112 and 113. This makes it possible for the suction pads 118 to be freely deformed, resulting in the forward end of each suction pad 118 being softly brought into close contact with the shutter 120.

It should be noted that the distance between the forward end surfaces of the suction pads 118 at the time when the latter come into close contact with the shutter 120 is made smaller than the thickness of the shutter 120 by 0.2 to 1.0 mm. As long as the foregoing dimensional difference remains within the range of 0.2 to 1.0 mm, it is assured that the forward end surface of each suction pad 118 is very softly deformed. When the shutter 120 is extracted from the injection-molding die upon completion of each injection molding operation, cooling air or another cooling fluid is ejected from the suction pads 118 toward the shutter 120, causing at least a part of the shutter 120 having the cooling air or the cooling fluid in contact therewith to be effectively cooled, resulting in the mechanical strength of the part being substantially increased.

Next, a mechanism for displacing the chuck arms 112 and 113 will be described below.

Flexible wires 136 are joined to the slidable base portion 138 such that they are connected to the lowermost end of a piston rod 141 adapted to slidably move in a pneumatic cylinder 140. On the other hand, a pair of compression springs 135 are disposed on the opposite side relative to the flexible wires 136 with the frame lower end surface 119a located therebetween so as to normally bias the slidable base portions 138 away from each other. In the case illustrated, two compression springs 135 are provided. It should of course be understood that the present invention may equally be applied to a single compression spring disposed with a central partition wall removed from the frame lower end surface 119a.

As shown in FIG. 4, a tube 137, by way of which each suction pad 118 is pneumatically connected to the vacuum pump, (not shown) is arranged such that it extends from the bottom of each suction pad 118 through each chuck arm, each slidable base portion 138 and the frame upper end portion until it reaches the vacuum pump. Of course, a part of the tube 137 between the slidable base portion 138 and the frame upper end portion is in the form of a flexible tube so as to accommodate the slidable movement of each slidable base portion 138.

Next, injection-molding of the shutter 120 and the operation of the extracting apparatus 130 will be described in detail below.

While a gap corresponding to the shutter 120 is formed in the closed injection molding die, molten synthetic resin is injected into the gap through a nozzle (not shown) to injection-mold the shutter 120 of the synthetic resin.

Subsequently, the movable die half 123 is raised in the direction C in FIG. 4, and thereafter both of the slide cores 121 and 122 are displaced away from each other to some extent. In addition, the ejection pin 114 in the center core 109 is raised so as to raise the shutter 120 above the upper surface of the slide cores 121 and 122, and thereafter the extracting apparatus 130 is displaced until the suction pads 118 are located opposite to the upper side surfaces of the shutter 120 which has been raised.

It is recommended that the extracting apparatus 130 be previously displaced to a predetermined position before the shutter 120 is raised by the ejection pin 114.

On completion of the displacement of the extracting apparatus 130 to the predetermined position, a cooling fluid such as air or the like is blown from both suction pads 118, whereby the shutter 120 is cooled to a temperature at which the shutter 120 can no longer be readily deformed. Then, the pneumatic cylinder 140 is actuated to pull the flexible wires 136, causing the chuck arms 112 and 113 to approach respective side surfaces of the shutter 120. At the same time or just before the suction pads 118 contact the shutter 120, the vacuum pump is driven to evacuate the region in the vicinity of the injection molding die so as to allow both suction pads 118 to firmly hold the shutter 120 by the action of the vacuum produced by the vacuum pump via the suction pads 118.

The position two which the suction pad 120 are displaced can restrictively be determined by bringing a part of the slidable base portion 138 into contact with a stopper 134 disposed on the support frame 119b at a predetermined position. Fine positional adjustment for each suction pad 118 can be precisely achieved by adjustably changing the contact position of the stopper 134 or by employing a mechanism (not shown) for dislocating the stopper 134.

After the shutter 20 is firmly held by both suction pads 118, the extracting apparatus 130 is displaced in the direction so as to extract the shutter 120 (i.e., in the D direction in FIG. 4) until the shutter 120 is completely drawn out of the injection molding die. Subsequently, the shutter 120 is transferred to the next stage.

The present invention has been described above with respect to an embodiment wherein a single molded product (shutter) is produced. Alternatively, the present invention may be applied to an embodiment wherein an injection molding die for simultaneously molding four or eight shutters is firmly held by both the chuck arms 112 and 113. In such a case, the flexible wires 136, the pulleys 133 and the pneumatic cylinder 140 as mentioned above can unchangeably be used in the same form described above.

As is apparent from the above description, according to the present invention, an opposing pair of chuck arms are slidably displaced toward each other below the support frame, and, on completion of each injection-molding operation for a molded product, i.e., a shutter, they are displaced together with the shutter in the upward direction. In addition, the positions where the chuck arms contact the shutter can be precisely adjusted without undesirable deformation of the shutter. Further, suction pads, each molded of an elastomeric material, are arranged inside the chuck arms such that the flexibility of each suction pad can satisfactorily be utilized. Consequently, a sufficiently high holding force can be maintained in spite of the fact that a small exterior force is imparted to the shutter, with the result that a shutter molded of a synthetic resin with a small thickness and at a high temperature can quickly be extracted from the injection molding die without malfunction or deformation of the shutter. Especially in case the chuck arms are positionally offset relative to the injection molding die, this positional offset can be compensated by the flexibility of each suction pad. In other words, the magnitude of an exterior force imparted to the shutter can be made small.

What is claimed is:

1. A method for extracting a U-shaped molded product while at an elevated temperature from an injection molding die without damage to said molded product using an apparatus including a pair of horizontally opposing chucking members, each member having a contact surface with an elastic member attached thereto, said method comprising the steps of:

actuating said horizontally opposing pair of chucking members with said attached elastic members, thereby slidably moving said chucking members toward each other in a horizontal direction to move said elastic members into contact with respective side surfaces of said molded product in said injection molding die and clamping said molded product with said elastic members to hold said molded product with predetermined force;

moving a suction pad into airtight contact with a rear surface of said molded product;

applying a vacuum to said suction pad to cause said suction pad to adhere to said rear surface; and simultaneously moving said pair of horizontally opposing chucking members and said suction pad in a direction so as to vertically extract said molded product from said injection molding die.

2. The method of claim 1, further comprising the step of, prior to said step of moving said suction pad into airtight contact with said rear surface of said molded product, blowing air through said suction pad to cool at least said rear surface of said molded product.

* * * * *